Sept. 21, 1943. R. E. LEAVENS 2,329,918
CUTTER
Filed March 14, 1942

Inventor
Robert E. Leavens
By E. V. Hardway
Attorney

Patented Sept. 21, 1943

2,329,918

UNITED STATES PATENT OFFICE 2,329,918

CUTTER

Robert E. Leavens, Houston, Tex.

Application March 14, 1942, Serial No. 434,731

2 Claims. (Cl. 146—160)

This invention relates to a cutter and has particular relation to a cutter for separating citrus fruits, vegetables, such as potatoes and the like, into sections.

An object of the invention is to provide a manually operable cutter formed with radial blades of such construction as to readily separate lemons, oranges, potatoes and the like into similar segments.

It is a further object of the invention to provide an implement of the character described having separate radial blades which are so assembled and secured together that they will penetrate through and completely sever the fruit or vegetable into sections without bruising or mutilating the sections or squeezing the juice therefrom.

With the above and other objects in view the invention has particular relation to certain novel features of construction, operation and arrangement of parts, examples of which are given in this specification and illustrated in the accompanying drawing, wherein.

Figures 1, 2:
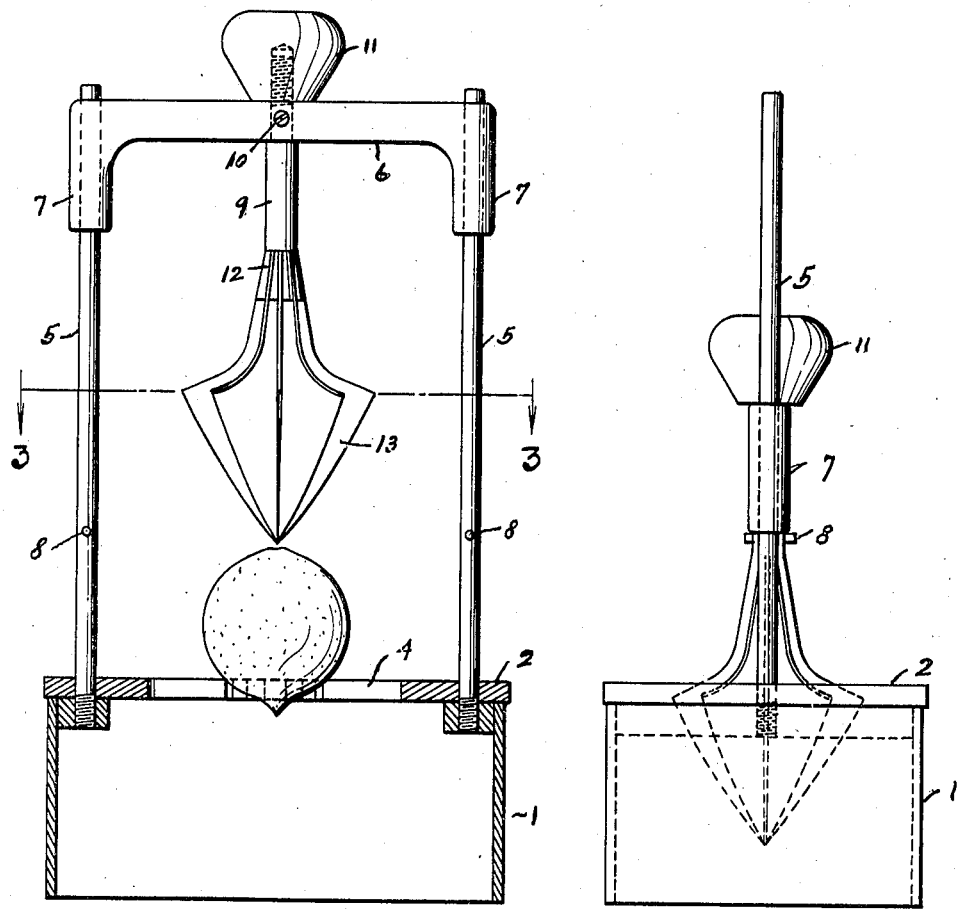
Figure 1 shows a side view of the implement showing the base in section and with the cutter blades in position to section the fruit.
Figure 2 shows an end view showing the cutter blades at the end of the stroke.

Referring now more particularly to the drawing wherein like numerals of reference designate the same parts in each of the figures, the numeral 1 designates the base as a whole which is of inverted, box-like construction and whose top forms a table 2 having a central opening 3 and the blade slots 4 radiating therefrom.

Upstanding from the ends of the base and secured to the table 2 there are the guides 5, 5.

There is a yoke 6 whose ends are formed with the vertically, elongated bearings 7, 7 which slide on the guides 5, 5 and whose downward movement is limited by the stops 8, 8 on the guides.

There is a shank 9 whose upper end is reduced and fitted upwardly through the yoke 6 and secured thereto by the set screw 10. The reduced upper end of the shank is threaded to receive the hand knob 11 which is screwed thereon.

The lower end of the shank 9 is flared and is provided with radial slots as 12 which are spaced apart therearound.

Figure 3:
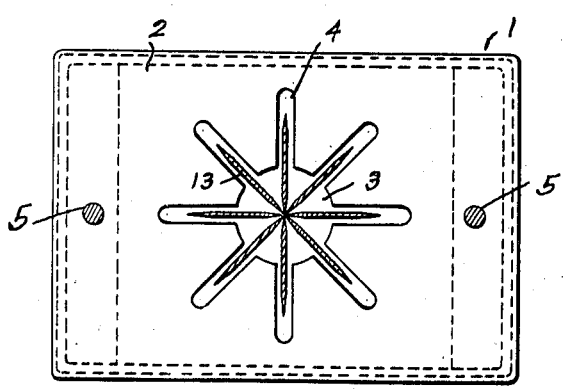
Figure 3 shows a cross-sectional view taken on the line 3—3 of Figure 1.
Figure 4:
Figure 4 shows a section severed from the fruit.

There is an assembly of radial cutter blades 13. The outer margins of these cutter blades taper downwardly toward an apex and are provided with sharp cutting edges and their inner margins meet at a common vertical axis and are also formed with sharp cutting edges as shown in Figure 3. The upper ends of the blades are reduced in width and fitted into the radial slots 12 as shown in Figure 4 and suitably secured therein by welding or soldering.

The lemon or other fruit or vegetable to be separated is located on the table 2 and is seated in the opening 3 as shown in Figure 1 with the blade assembly elevated. A downward pressure on the knob 11 will force the blade assembly downwardly through the fruit or vegetable on the table, the apex of the cutter assembly penetrating the fruit and the outer and inner edges of the blades completely severing the fruit into similar sections. Since the blades are independent of each other they are sufficiently yieldable to not exert a squeezing pressure against the sections between the blades so that no juice will be squeezed out of the fruit while it is being separated into sections. As the cutter assembly is moved downwardly the blades work through the blade slots 4 of the table 2.

The drawing and description are illustrative merely, while the broad principle of the invention will be defined by the appended claims.

What I claim is:

1. An implement of the character described having a table provided with a central opening and having blade slots radiating from the opening, spaced guides upstanding from the table, a yoke having elongated end bearings which slide on the guides, a shank whose upper end is reduced and fitted upwardly through the yoke, an end knob threaded on to the upper end of the shank, the lower end of the shank being flared and provided with radial slots spaced apart therearound, an assembly of cutter blades whose outer margins are tapered downwardly and provided with sharp cutting edges and whose inner margins meet at a common vertical axis and are formed with sharp cutting edges, the upper ends of the blades being reduced in width and fitted into said slots at the lower end of the shank and which are secured therein, said blades being yieldable, having their upper ends independently fixedly secured at the lower end of the shank but capable of relative yielding movement beneath the shank.

2. In an implement of the character described the subcombination comprising a shank, an assembly of cutter blades at one end of the shank whose outer margins taper toward an apex and are provided with sharp cutting edges and whose inner margins meet at an axis common with the axis of the shank and are formed with sharp cutting edges, the ends of the blades, adjacent the shank, being independently fixedly secured to said end of the shank and being yieldable to allow relative yielding movement of the blades beneath the shank.

ROBERT E. LEAVENS.